(12) United States Patent
Wu et al.

(10) Patent No.: US 12,439,716 B2
(45) Date of Patent: Oct. 7, 2025

(54) INVERSE DESIGN OF ANGLE SENSITIVE METASURFACES FOR LIGHT FIELD IMAGING

(71) Applicant: UNIVERSITY OF SOUTHERN CALIFORNIA, Los Angeles, CA (US)

(72) Inventors: Wei Wu, Los Angeles, CA (US); Tse-Hsien Ou, Los Angeles, CA (US); Hao Yang, Los Angeles, CA (US); Yunxiang Wang, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 1168 days.

(21) Appl. No.: 17/334,196

(22) Filed: May 28, 2021

(65) Prior Publication Data
US 2021/0375961 A1   Dec. 2, 2021

Related U.S. Application Data

(60) Provisional application No. 63/031,273, filed on May 28, 2020.

(51) Int. Cl.
| | | |
|---|---|---|
| *H10F 39/00* | (2025.01) | |
| *G02B 1/00* | (2006.01) | |
| *G06F 30/398* | (2020.01) | |
| *H04N 13/20* | (2018.01) | |
| *H04N 25/76* | (2023.01) | |

(52) U.S. Cl.
CPC .......... *H10F 39/805* (2025.01); *G02B 1/002* (2013.01); *G06F 30/398* (2020.01); *H04N 13/20* (2018.05); *H04N 25/76* (2023.01)

(58) Field of Classification Search
CPC . H01L 27/14689; G02B 1/002; H10F 39/805; H10F 39/8067; G06F 30/398; H04N 13/20; H04N 25/76
See application file for complete search history.

(56) References Cited

U.S. PATENT DOCUMENTS

| | | | |
|---|---|---|---|
| 6,043,115 A  * | 3/2000 | Pan ................. | H01L 21/823871 |
| | | | 257/E21.641 |
| 2019/0044003 A1* | 2/2019 | Heck ..................... | G02B 1/002 |

* cited by examiner

*Primary Examiner* — Tucker J Wright
(74) *Attorney, Agent, or Firm* — Brooks Kushman P.C.

(57) ABSTRACT

A semiconductor-based sensor to detect light angle of incidence includes a semiconductor light sensor element and a patterned spatially inhomogeneous dielectric layer disposed over the semiconductor light sensor element. Characteristically, spatial inhomogeneity of the patterned spatially inhomogeneous dielectric layer is optimized to provide a maximized electric field in the semiconductor light sensor element such that the semiconductor-based sensor is operable to detect one or more incident angles of light at a predefined wavelength or wavelengths of light.

31 Claims, 18 Drawing Sheets
(4 of 18 Drawing Sheet(s) Filed in Color)

Optimization method

Continuous Particle Swarm Optimization

Continuous index

Two layer index roundoff

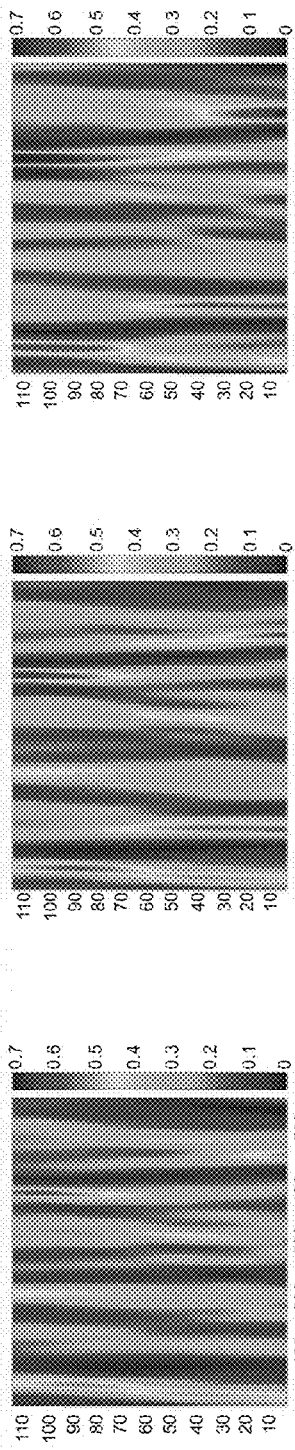
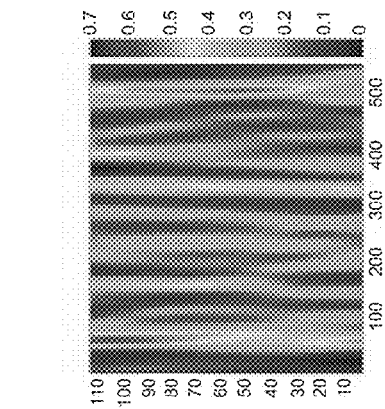
Fig. 10D-1  Fig. 10D-2  Fig. 10D-3  Fig. 10D-4  Fig. 10D-5  Fig. 10D-6  Fig. 10D-7

- These figures show the field distribution inside the silicon substrate
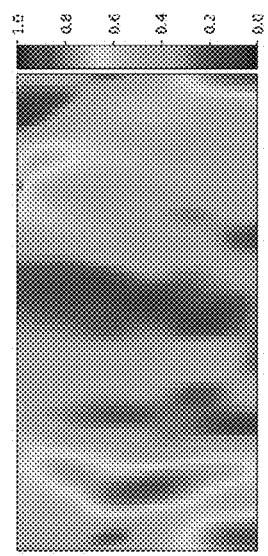
−30° Fig. 11C-1
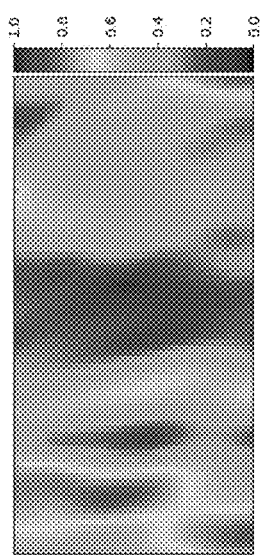
−10° Fig. 11C-2
Fig. 11C-3
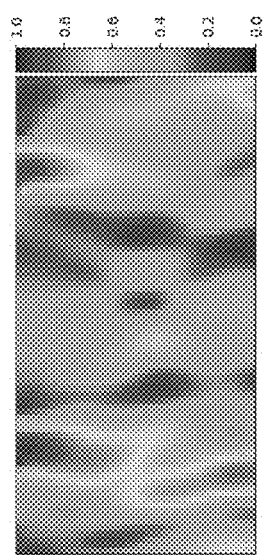
0° Fig. 11C-4
−20° Fig. 11C-5
10° Fig. 11C-6
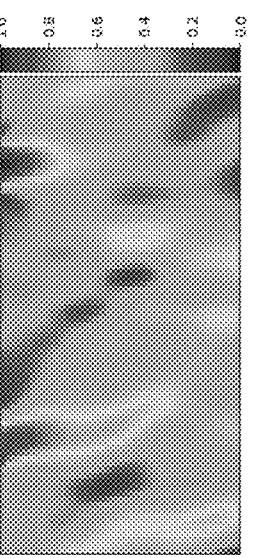
Fig. 11C-7

INVERSE DESIGN OF ANGLE SENSITIVE METASURFACES FOR LIGHT FIELD IMAGING

CROSS-REFERENCE TO RELATED APPLICATIONS

This application claims the benefit of U.S. provisional application Ser. No. 63/031,273 filed May 28, 2020, the disclosure of which is hereby incorporated in its entirety by reference herein.

TECHNICAL FIELD

In at least one aspect, the present invention is related to sensor designs with enhanced adsorption in the sensor's light absorbing layers.

BACKGROUND

Metasurfaces have shown extraordinary promise to achieve comprehensive control over the characteristics of light scattered, transmitted, and reflected from such surfaces. Metasurfaces can be viewed as artificially designed arrays of subwavelength optical scatterers, where each scatterer introduces abrupt changes to the phase, amplitude, or polarization of the reflected or transmitted electromagnetic waves. Therefore, metasurfaces offer the ability to control the wavefront of the scattered, transmitted, and reflected light, thereby creating new flat optics and ultrathin optoelectronic components. Metasurfaces have been used to demonstrate a number of low-profile optical components with important capabilities, including focusing, polarization control, and detection, holograms, and quantum light control.

Detection of the incident angle in semiconductor-based sensors is an important application thereof. The addition of lenses or apertures to CMOS sensors are two common ways to detect incident angle. However, these designs tend to be relatively large and/or obstructive to light thereby, lowering the signal-to-noise ratio and image quality.

Accordingly, there is a need for improved designs for detecting incident angle in CMOS light sensors.

SUMMARY

In at least one aspect, a semiconductor-based sensor to detect one or more light angles of incidence is provided. The semiconductor-based sensor includes a semiconductor light sensor element and a patterned spatially inhomogeneous dielectric layer assembly disposed over the semiconductor light sensor element. Characteristically, the spatial inhomogeneity of the patterned spatially inhomogeneous dielectric layer assembly is optimized to provide a maximized electric field in the semiconductor light sensor element such that the semiconductor-based sensor is operable to detect one or more incident angles of light at a predefined wavelength or wavelengths of light. Advantageously, the patterned spatially inhomogeneous dielectric layer assembly includes one or more patterned spatially inhomogeneous dielectric layers.

In another aspect, a method for making a semiconductor-based sensor that detects one or more light angles of incidence is provided. The semiconductor-based sensor includes a patterned spatially inhomogeneous dielectric layer assembly disposed over a semiconductor light sensor element. The patterned spatially inhomogeneous dielectric layer assembly includes one or more patterned spatially inhomogeneous dielectric layers. Characteristically, each patterned spatially inhomogeneous dielectric layer is defined by a plurality of adjustable design parameters. The method incudes a step of receiving a set of optimized design parameters determined for each patterned spatially inhomogeneous dielectric layer by simulating the amount of light absorbed by semiconductor-based sensor with a simulation method and optimizing the plurality of adjustable design parameters for each patterned spatially inhomogeneous dielectric layer with an optimization method to enhance light absorption at one or more predetermined incident angles in the semiconductor light sensor element to form the set of optimized design parameters. The set of optimized design parameters includes optimized values for the plurality of adjustable design parameters of each patterned spatially inhomogeneous dielectric layer. The patterned spatially inhomogeneous dielectric layer assembly 14 is fabricated (layer by layer) over the semiconductor light sensor with the plurality of adjustable design parameters for each patterned spatially inhomogeneous dielectric layer set to values that are within 20 percent of corresponding values in the set of optimized design parameters.

In another aspect, a metasurface on a CMOS sensor is designed to detect the incident angle of light at a predefined wavelength or wavelength of light. The transmission of the metasurface is highly sensitive to the incident angle. So the total electric field transmitted to the CMOS sensor is dependent on the incident angle. By measuring the output of the CMOS sensor, we can calculate the incident angle can be calculated. Advantageously, a light field imaging sensor can be realized. An optimization algorithm combining with FDTD simulation is applied to design the metasurface.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a further understanding of the nature, objects, and advantages of the present disclosure, reference should be had to the following detailed description, read in conjunction with the following drawings, wherein like reference numerals denote like elements and wherein:

FIGS. 10D-1, 10D-2, 10D-3, 10D-4, 10D-5, 10D-6, and 10D-7 provide the electrical field distribution when light is incident at different angles.

FIGS. 11C-1, 11C-2, 11C-3, 11C-4, 11C-5, 11C-6, and 11C-7 provide the field distribution for the four-layer metasurface of FIG. 10A at angles of incidence of −30°, −20°, −10°, 0°, 10°, 20°, and 30°.

DETAILED DESCRIPTION

Figure 1A:
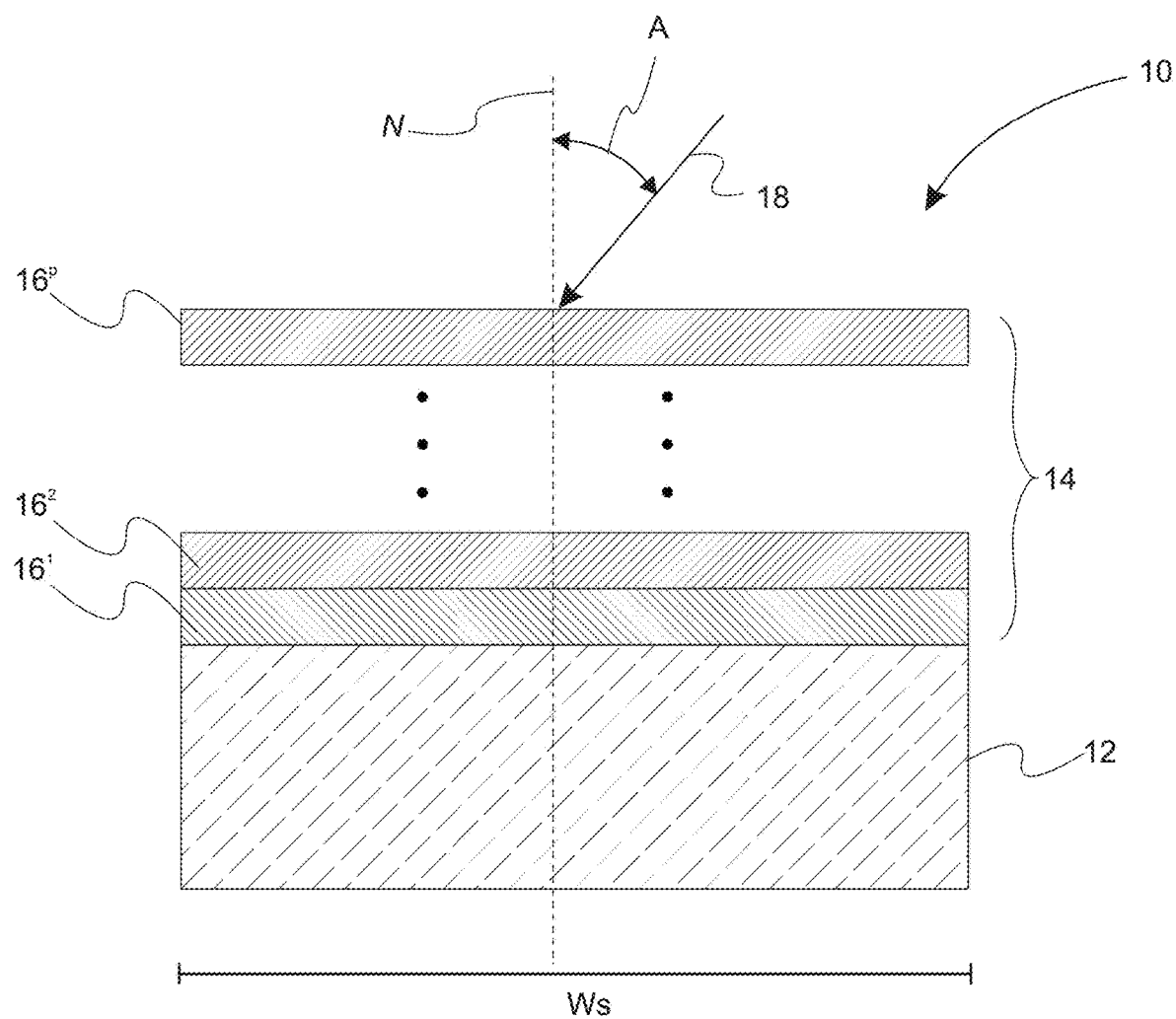
FIG. 1A is a schematic illustration describing a semiconductor-based sensor, and in particular a CMOS light sensor.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The phrase "composed of" means "including" or "consisting of" Typically, this phrase is used to denote that an object is formed from a material.

The term "one or more" means "at least one" and the term "at least one" means "one or more." The terms "one or more" and "at least one" include "plurality" as a subset.

The term "substantially," "generally," or "about" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

In the examples set forth herein, concentrations, thicknesses, temperature, and deposition conditions can be practiced with plus or minus 50 percent of the values indicated rounded to or truncated to two significant figures of the value provided in the examples. In a refinement, concentrations, thicknesses, temperature, and deposition conditions can be practiced with plus or minus 30 percent of the values indicated rounded to or truncated to two significant figures of the value provided in the examples. In another refinement, concentrations, thicknesses, temperature, and deposition conditions can be practiced with plus or minus 10 percent of the values indicated rounded to or truncated to two significant figures of the value provided in the examples.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Throughout this application, where publications are referenced, the disclosures of these publications in their entireties are hereby incorporated by reference into this application to more fully describe the state of the art to which this invention pertains.

"FDTD" means finite-difference time-domain method.

"IR" means infrared.

"PDMS" means polydimethylsiloxane.

"PML" means perfectly matched layer.

"RCWA" means rigorous coupled-wave analysis.

"NIL" means nanoimprint lithography.

"MEEP" refers to a free finite-difference time-domain simulation software package developed at MIT to model electromagnetic systems.

The term "low-κ dielectric" refers to material with a small relative dielectric constant (κ, kappa) relative to silicon dioxide.

The term "high-κ dielectric" refers to a material with a high dielectric constant (κ, kappa) compared to silicon dioxide.

In a refinement, the term "optimized" means that a set of adjustable design parameters for a patterned spatially inhomogeneous dielectric layer assembly are adjusted by an optimization algorithm to provide a set of optimized parameters. The set of optimized parameters includes the plurality of design parameters for each constituent patterned spatially inhomogeneous dielectric layer. The set of optimized parameters can be used to fabricate a patterned spatially inhomogeneous dielectric assembly with increased light absorption in a semiconductor light sensor element with the patterned spatially inhomogeneous dielectric layer assembly at one or more predetermined angles and therefore detect said angles, as compared the semiconductor light sensor element without the patterned spatially inhomogeneous dielectric layer. In a further refinement, the term "optimized" means that the set of adjustable design parameters for a patterned spatially inhomogeneous dielectric layer assembly can be used to fabricate a patterned spatially inhomogeneous dielectric assembly with a maximally attainable light absorption at one or more predetermined angles and therefore detect said angles in a semiconductor light sensor element having the patterned spatially inhomogeneous dielectric assembly disposed thereon.

With reference to FIG. 1A, a schematic illustration describing a semiconductor-based sensor operable to detect one or more light angles of incidence, and in particular, a CMOS light sensor is provided. Semiconductor-based sensor 10 includes semiconductor light sensor element 12 and one or more patterned spatially inhomogeneous dielectric layer assemblies 14. Typically, semiconductor light sensor element 12 includes a photoactive component that converts photons into currents. The photoactive component be a p-n junction, p-i-n junction, a metal-semiconductor-metal photodetector element, a phototransistor element, and the like. In a particularly useful variation, the semiconductor-based sensor is a silicon-based sensor with the silicon light sensor element 12 (e.g., with a p-n junction or p-i-n junction). In a refinement, the semiconductor light sensor element 12 is a CMOS light sensor element. Typically, Semiconductor-based sensor 10 and one or more patterned spatially inhomogeneous dielectric layer assemblies 14 each independently has a width Ws along direction $d_1$ and length Ls along direction d2, which is perpendicular to $d_1$ from about 1 micron to 10 microns. In a refinement, semiconductor-based sensor 10 and patterned spatially inhomogeneous dielectric assembly 14 each independently have a width and length from about 3 microns to 7 microns.

Patterned spatially inhomogeneous dielectric layer assembly 14 is disposed over semiconductor light sensor element 12. In a refinement, patterned spatially inhomogeneous dielectric layer assembly contacts semiconductor light sensor element 12. Patterned spatially inhomogeneous dielectric layer assembly 14 includes one or more patterned spatially inhomogeneous dielectric layers $16^p$ wherein p is an integer layer running from 1 to $p_{max}$ and $p_{max}$ is the total number of patterned spatially inhomogeneous dielectric layers. In a refinement, $p_{max}$ is 1, 2, 3, 4, 5, or 6. Characteristically, patterned spatial inhomogeneity of the patterned spatially inhomogeneous dielectric layer assembly is optimized to provide a maximized electric field in the semiconductor light sensor element such that the semiconductor-based sensor is operable to detect one or more predetermined incident angles of light at a predefined wavelength or wavelengths of light. In particular, patterned spatially inhomogeneous dielectric layer assembly 14 is a metasurface in which each layer can be formed by photolithography. Advantageously, patterned spatially inhomogeneous dielectric layer assembly 14 is designed to enhance the intensity of the electric field within semiconductor light sensor element 12 by enhancing the resonant modes within the semiconductor light sensor element 12. Characteristically, patterned spatially inhomogeneous dielectric layer assembly 14 (e.g., a metasurface layer) is designed is designed to detect the incident angle of light at a predefined wavelength or wavelengths of light. Since the transmission of patterned spatially inhomogeneous dielectric layer assembly 14 (e.g., the metasurface layer) is highly sensitive to the incident angle, the total electric field transmitted to the CMOS light sensor is dependent on the incident angle. Characteristically, the incident angle can be calculated by measuring the output of the semiconductor-based sensor 10 (e.g., a CMOS sensor), which will increase as light absorption increases. In this regard, incident angle A is the angle between normal N to the surface and incident light ray 18. In a refinement, the incident angle is from −30 to 30 degrees. In another refinement, the incident light has a wavelength in the visible (i.e., 380 nm to 740 nm) or near-infrared regions of the electromagnetic spectrum (i.e., 780 nm to 2500 nm), Therefore, the incident light can have a wavelength from 380 nm to 2500 nm). One wavelength that has been analyzed is 850 nm. In a refinement, the patterned spatially inhomogeneous dielectric layer assembly 14 is deposited directly onto the semiconductor light sensor element 12. However, it should be appreciated that the semiconductor light sensor element 12 may have another optically transparent protective layer onto which the semiconductor light sensor element 12 is deposited. Such a transparent protective layer must be sufficiently thin so as not to interfere with the absorption enhancement provided by the patterned spatially inhomogeneous dielectric layer assembly 14.

Figure 1B:
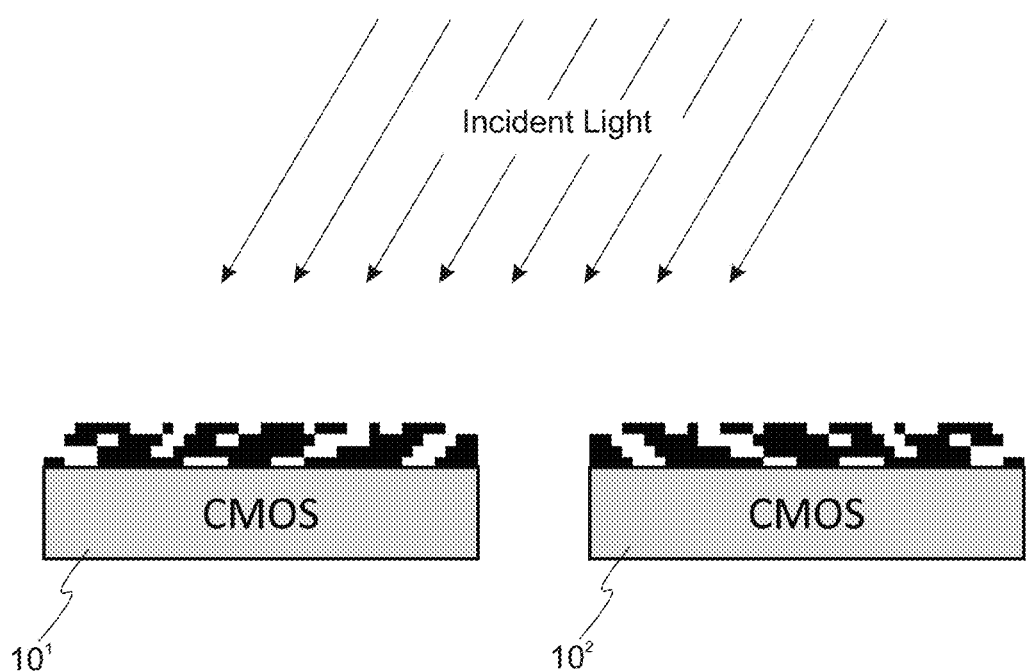
FIG. 1B provides a schematic illustration describing the use of two semiconductor-based sensor to detect the angle of incidence.

In another variation, multiple semiconductor-based sensors of the design of FIG. 1A are needed to sense both light intensity and the incident angle at the same time. Referring to FIG. 1B, to sense the intensity and the angle in horizontal plane, two sensors $10^1$ and $10^2$ are needed. Each sensor has the general design set forth in FIG. 1A. One is more sensitive to the light coming from the right, and the other is more sensitive to the light from the left. Comparing the signals from those two sensors can tell us both the direction information and the intensity information. If we want to know both the direction in the horizontal plane and the vertical plane, then at least three sensors are needed mathematically; most likely, four sensors ("facing" left, right, up and down) will be used. In a refinement, the two metasurfaces sensors $10^1$ and $10^2$ have the same structure but in opposite directions. Since they are close to each other, when the light comes, the incident angle for both sensors is almost the same. Moreover, the transmission response of the sensors is different because the sensors are in the opposite direction. This difference can be measured and determined by the sensor. By measuring the difference in the response between these two metasurfaces, the incident angle can be determined.

Figure 2A:
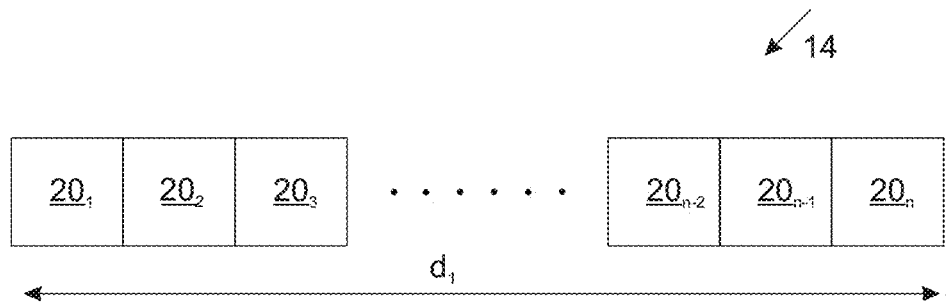
FIGS. 2A, 2B, and 2C provides cross sections for models of a patterned spatially inhomogeneous dielectric layer.
Figure 2B:
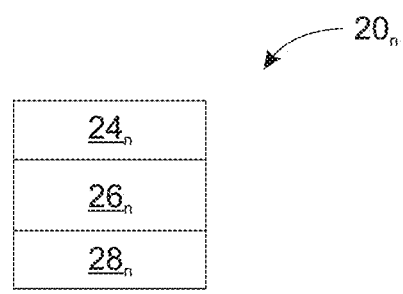
Figure 2C:
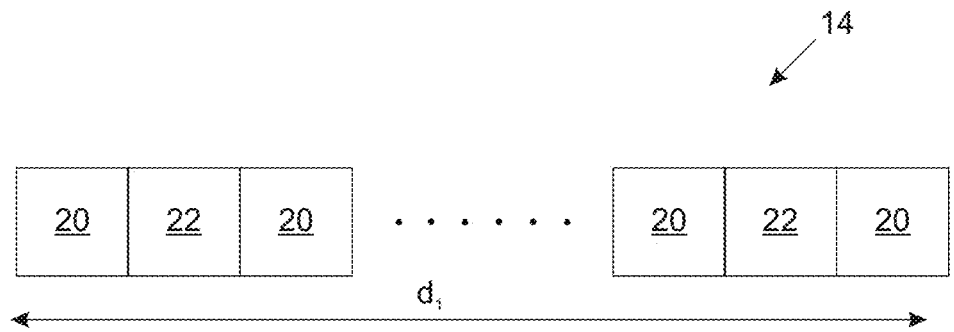

The semiconductor-based sensor, and in particular, the spatially inhomogeneous dielectric layer assembly 14, is designed and constructed by simulating an amount absorbed by silicon-based sensor by a simulation method and optimizing the plurality of adjustable design parameters by an optimization method to enhance light absorption in the semiconductor light sensor element to form a set of optimized design parameters. FIG. 2A provides a cross-section showing a model for the patterned spatially inhomogeneous dielectric layers $16^p$. In this variation, patterned spatially inhomogeneous dielectric layers $16^p$ are independently modeled as an array of cells $20^n$ (e.g., dielectric cells). In a refinement, subsets of cells $20^n$ will have a different refractive index. For example, a subset of the cells can be an air gap while other cells are composed of one or more dielectric layers depicted by item numbers $22^n$, $24^n$, and $26^n$ as depicted in FIG. 2B. In this figure, n is an integer label running from 1 to $n_{max}$ where $n_{max}$ is the maximum number of n for the $d_1$ direction at a cross-section thereof. FIG. 2C provides an example in which cells 20 composed of a first composition alternate along direction $d_1$ with cells 32 composed second composition. Typically, the cells of FIGS. 2A, 2B, and 2C are nanostructures having at least one dimension from about 50 to 500 nm.

Figure 3:
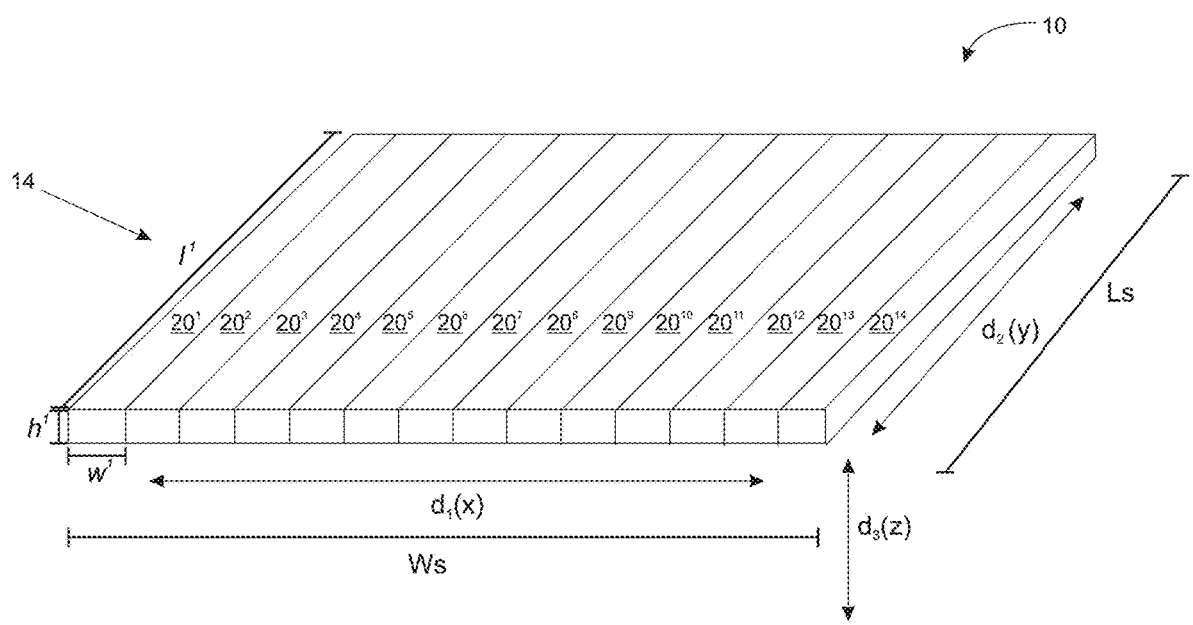
FIG. 3 provides a schematic of a patterned spatially inhomogeneous dielectric layer having a plurality of columns to be disposed over a sensor element.

FIG. 3 provides an illustration in which cells $20^n$ (e.g., dielectric cells) are rectangular columns extending across the surface of semiconductor light sensor element 12 along directions $d_1$ and $d_2$, which are perpendicular to each other. Each cell $20^n$ can be defined by a width $w^n$, a length $l^n$, and a height $h^n$ along directions $d_1$, $d_2$, and $d_3$, respectively. Directions $d_1$, $d_2$, and $d_3$ define a cartesian coordinate system that can apply coordinates x, y, and z as is conventionally used. As set forth above, a subset of the cells $20^n$ are a high-κ dielectric. In a further refinement, a subset of the cells 20 can be a low k-dielectric. In some refinements, a subset of the cells are composed of silicon dioxide or include a sublayer of silicon dioxide. In still another refinement, array of cells $20^n$ includes cells that are air, a dielectric material or sublayers of the dielectric material. In a variation, the patterned spatially inhomogeneous dielectric layers $16^p$ include an array of cells $20^n$ in which a first subset of the array of cells includes cells that have a first refractive index and a second subset of the array of cells includes cells that have a second refractive index. Advantageously, spatial inhomogeneity of the patterned spatially inhomogeneous dielectric layer assembly is optimized with respect to a set of adjustable design parameters to increase light absorption in the semiconductor light sensor element as compared to light absorption in the semiconductor light sensor element without the patterned spatially inhomogeneous dielectric layer assembly with the set of adjustable design parameters (and the plurality of adjustable design parameters for each layer) including cell lengths, cell widths, and optionally refractive index for each cell. The optimizations and simulations set forth below suggest that a useful range for the height $h^n$ is from about 300 nm to about 1 micron and the width $w^n$ from about 50 nm to about 1 micron. In some refinements, the height $h_n$ is at least about 200 nm, 300 nm, 400 nm, or 500 nm, and at most in increasing order of preference, 1 micron, 900 nm, 800 nm, 750 nm, or 700 nm. In some refinements, the width $w^n$ is at least about 25 nm, 50 nm, 100 nm, 200 nm, or 500 nm and at most, in increasing order of preference, 1.5 microns, 1.2 microns, 1 micron, 750 nm, 500 nm, 350 nm, or 300 nm. For columns, the length $l^n$ can be somewhat arbitrarily chosen and can be from about 0.5 microns to 10 microns. This variation is suitable when the incident light is polarized.

Figure 4:
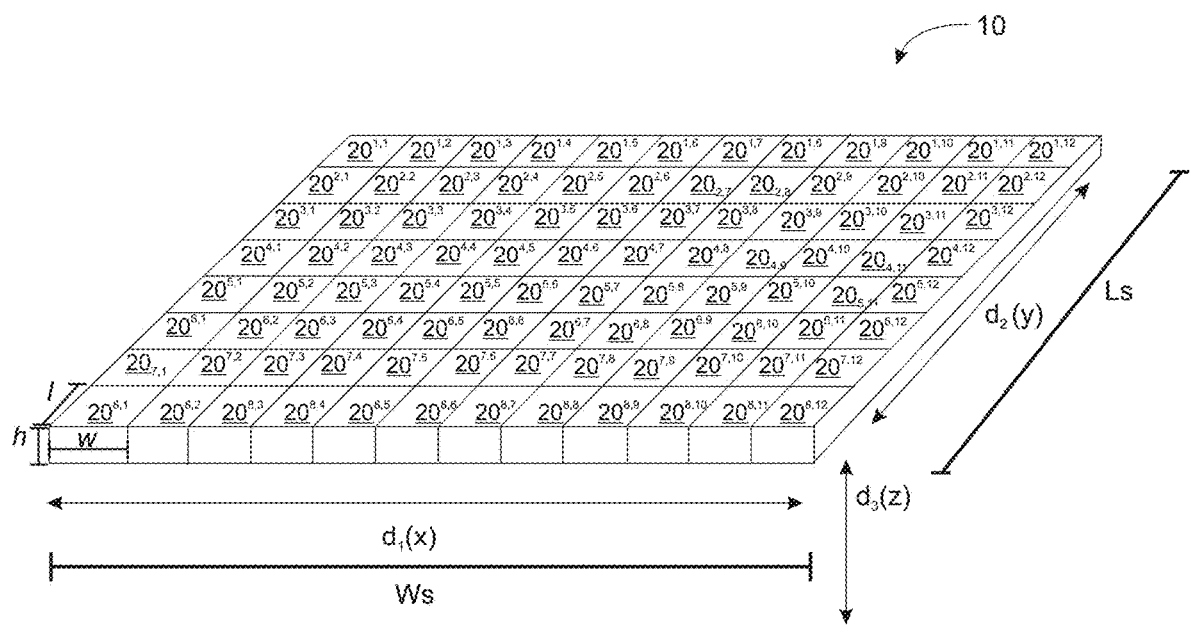
FIG. 4 provides a schematic of a patterned spatially inhomogeneous dielectric layer having a plurality of cells.

FIG. 4 provides an illustration in which cells $20^{n,m}$ (e.g., dielectric cells) are discrete objects (e.g., geometric solids) arranged along directions $d_1$ and $d_2$ and disposed over of the surface of semiconductor light sensor element 12. In this figure, n and m are integer labels for cells $20^{n,m}$ running from 1 to $n_{max}$ and 1 to $m_{max}$, respectively. Moreover, n is a label for cells along direction $d_1$ and $n_{max}$ is maximum value for n in the $d_1$ direction. Similarly, m is label for cells along direction $d_2$ and $m_{max}$ is the maximum value for m in the $d_2$ direction. The discrete objections that define cells $20^{n,m}$ can be a geometric 3D solids such as cubes, trapezoidal prisms (i.e., a geometric prism), pyramids, parallelepiped, cones, cylinder, tetrahedron, and the like. Typically, cells $20^{n,m}$ are formed from a dielectric material, layers of dielectric materials, or air gaps. In a refinement a subset of the cells $20^{n,m}$ are composed of a high-κ dielectric. Examples of such high-κ dielectrics include, but are not limited to, hafnium silicate, zirconium silicate, hafnium dioxide, zirconium dioxide, and combinations thereof. In a further refinement, a subset of the cells $20^{n,m}$ are composed of a low-κ dielectric. Examples of low-κ dielectrics include but are not limited to, porous silicon dioxide, porous organosilicate glasses, spin-on organic polymeric dielectrics, and air. Moreover, a subset of the cells can also be composed of silicon dioxide or includes silicon dioxide sublayers. Therefore, a first subset of the cells can be composed of a high-κ dielectric material, while a second subset of the cells can be composed of a low-κ dielectric material.

The optimizations and simulations set forth below indicate that a useful range for the height $h^{n,m}$ is from about 300 nm to about 1 micron and the width $w^{n,m}$ from about 50 nm to about 1 micron In some refinements, the height $h^{n,m}$ is at least about 200 nm, 300 nm, 400 nm, or 500 nm, and at most in increasing order of preference, 1 micron, 900 nm, 800 nm, 750 nm, or 700 nm. In some refinements, the width $w^n$ is at least about 25 nm, 50 nm, 100 nm, 200 nm, or 500 nm and at most, in increasing order of preference, 1.5 microns, 1.2 microns, 1 micron, 750 nm, 500 nm, 350 nm, or 300 nm. In some refinements, the length $l^{n,m}$ is at least about 25 nm, 50 nm, 100 nm, 200 nm, or 500 nm and at most, in increasing order of preference, 1.5 microns, 1.2 microns, 1 micron, 750 nm, 500 nm, 350 nm, or 300.

The simulations set forth below also indicate that an optimal design of spatially inhomogeneous dielectric layer assembly 14 includes two or more patterned spatially inhomogeneous dielectric layers $16^p$. Therefore, an optimal design of the patterned spatially inhomogeneous dielectric layer assembly $16^p$ can include 2, 3, 4, 5, 6, 7 or more patterned spatially inhomogeneous dielectric layers $16^p$. In a refinement, an optimal design of the patterned spatially inhomogeneous dielectric layer assembly $16^p$ can include 2, 3, 4, or 5 patterned spatially inhomogeneous dielectric layers $16^p$. In a refinement, each of these patterned spatially inhomogeneous dielectric layers $16^p$ has a non-periodic arrangement of dielectric cells over their full spatial extent. In a further refinement, adjacent patterned spatially inhomogeneous dielectric layers 16' have a different arrangement of dielectric cells.

As set forth above, an optimization algorithm is combined with a simulation algorithm to design a spatially inhomogeneous dielectric layer assembly 14 with optimal or near-optimal detections of a predetermined angle of incidence for light incident on the semiconductor-based sensor 10. In one refinement, the simulation method is a finite-difference time-domain (FDTD) method. In another variation, the simulation method is a rigorous coupled-wave analysis method. In should be appreciated that another number of optimization method can be used to obtain the set of optimized design parameters. In one refinement, the optimization is a global optimization method. Examples of global optimization methods include stochastic optimization methods, a particle swarm optimization algorithms, genetic optimization algorithms, Monte-Carlo optimization methods, gradient-assisted optimization method, simulated annealing optimization algorithms, pattern search optimization methods, a Multistart algorithms, and the like A particularly useful optimization method is particle swarm optimization. In the particle swarm optimization algorithm, potential solutions referred to as particles, flies (i.e., moves within) in a multi-dimensional search space with a velocity. The velocity is dynamically adjusted according to the flying experience of the particle and other particles. In a basic algorithm for the particle swarm method, an objection function $f(p_i)$ is optimized where $p_i$ is the vector of particle positions. For the present invention, the objective function is provided by minimizing:

$$\min \Sigma (A_i - A_{i,target})^2$$

where $A_i$ is the absorption at incident angle i, $A_{i,target}$ is the target absorption at incident angle i. The summation is overall angle for which detection is to be optimized. The particle's position is initialized with a uniformly distributed random vector $x_i$ which is set between upper and lower limits. The particle's best know position $p_i$ is initialized to the initial position vector $x_i$. If f(pi) is less than f(g) then the swarm's best-known position g is updated with pi. Initialize the particle's velocity vi is initialized with a velocity value between predetermined upper and lower velocity limits. This iteration loop starts as follows. While the termination criteria is not met, the particle velocity $v_{i,d}$ for each particle and each dimension d is updated by $\omega \cdot v_{i,d} + \varphi_p \cdot r_p \cdot (p_{i,d} - x_{i,d}) + \varphi_g \cdot r_g \cdot (g_d - x_{i,d})$ where $v_{i,d}$ is the velocity of the $i^{th}$ particle in the d dimension, $r_p$, $r_g$ are random numbers between 0 and 1, $p_{i,d}$ is the $i^{th}$ particle's best known position in the d dimension, $x_{i,d}$ is the $i^{th}$ particle's position in the d dimension, $g_d$ is the particle's best position vector in the d dimension. The particle's position $x_i$ is updated by $x_i + lr \cdot vi$ where lr is a predetermined learning rate between 0 and 1. If f(xi)<f(pi) then the particle's best known position pi is updated with xi. If $f(p_i)$<f(g), then update the swarm's best-known g is updated with position pi. The algorithm then returns to the iteration loop start until the stop criteria is met. The stop condition can be the execution of a predetermined number of iterations or when the absorption reaches a predetermined value.

As set forth above, the metasurface is fabricated over the semiconductor light sensor element with the plurality of adjustable design parameters set to values that are within a predetermined percentage of the optimized design parameters. In a refinement, the plurality of adjustable design parameters set to values that are within 20% of the optimized design parameters. In other refinements, the plurality of adjustable design parameters set to values that are within, in increasing order of preference 20%, 15%, 10%, 5%, 1% or 0%, of the optimized design parameters. As set forth above, the patterned spatially inhomogeneous dielectric layer is modelled as an array of cells each of which can have a different refractive index. In this model, the plurality of adjustable design parameters include cell height, cell width, and cell gap between adjacent cells. In a further refinement, the plurality of adjustable design parameters includes refractive index of each cell. In one refinement, the cells are rectangular columns extending across the surface of the semiconductor light sensor element. In another refinement, the cells are discrete objects that alternate along each direction of the surface of the semiconductor light sensor element.

Figure 5A:
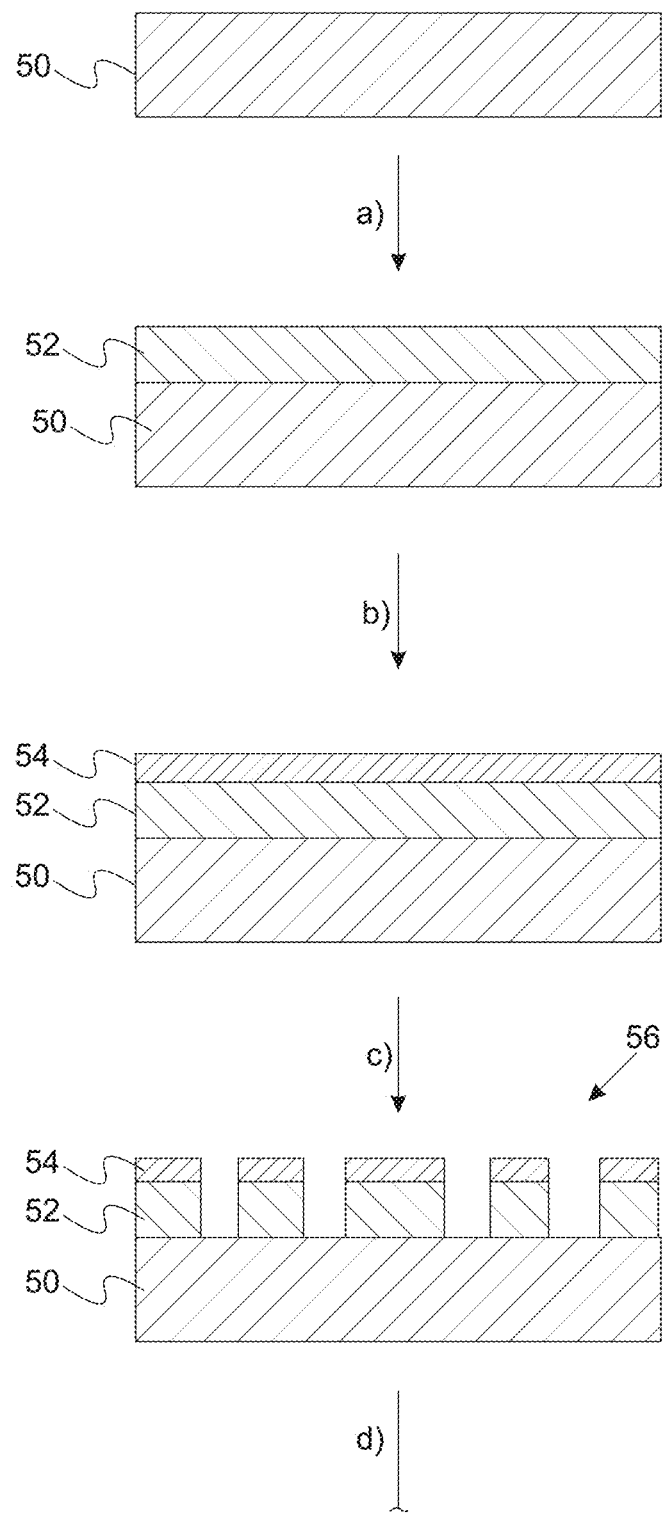
FIGS. 5A and 5B provide a flowchart illustrating the fabrication of patterned spatially inhomogeneous dielectric layers.
Figure 5B:
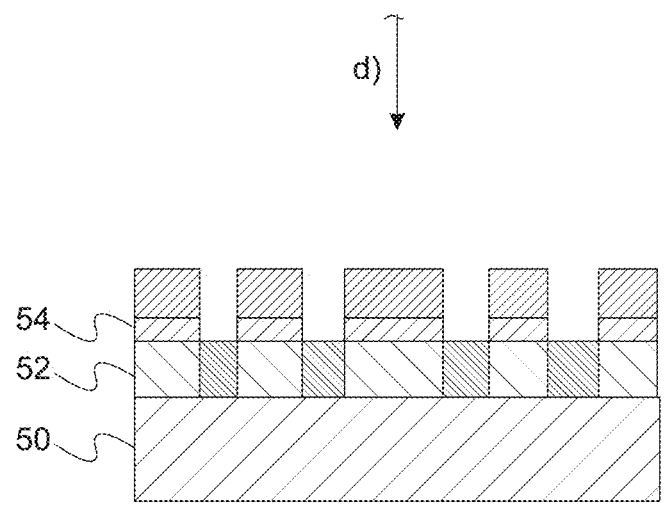
Figure 5B:
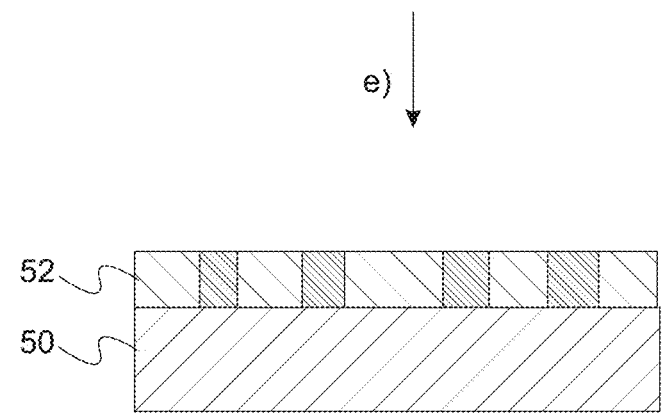

Referring to FIG. 5, a schematic flow chart of a method of fabricating the metasurface is provided. In step a), a first dielectric layer 52 (e.g., $SiO_2$) is deposited using a process such as CVD over semiconductor device 50 (e.g., the semiconductor light sensor element). In step b), a spin-coated UV resist 54 is deposited on top of first oxide layer 52. In step c), photolithography is conducted such that first oxide layer 52 is now a patterned layer 56. In step d), a second dielectric layer 54 (e.g., $HfO_2$ or $TiO_2$) is deposited using a process such as CVD. In step e), UV resist 54 is removed to expose a spatially inhomogeneous dielectric layer that can be used in the spatially inhomogeneous dielectric layer assembly set forth above. Additional layers can be added by repeating steps a)-e). Each layer produced in this manner can have a different pattern and use different dielectric materials. Selections for the dielectric materials can be high-κ dielectrics, low-κ dielectrics, and silicon dioxide as set forth above.

In another embodiment, a method for making a semiconductor-based sensor that detects one or more light angles of incidence is provided. Referring to FIG. 1A, semiconductor-based sensor 10 includes a patterned spatially inhomogeneous dielectric layer assembly 14 disposed over a semiconductor light sensor element 12. Characteristically, the patterned spatially inhomogeneous dielectric layer assembly 14 including one or more patterned spatially inhomogeneous dielectric layers $16^p$ as defined above. Each patterned spatially inhomogeneous dielectric layer can be defined by a plurality of adjustable design parameters. The method incudes a step of receiving a set of optimized design parameters determined for each patterned spatially inhomogeneous dielectric layer by simulating the amount of light absorbed by semiconductor-based sensor with a simulation method and optimizing the plurality of adjustable design parameters for each patterned spatially inhomogeneous dielectric layer with an optimization method to enhance light absorption at one or more predetermined incident angles in the semiconductor light sensor element to form the set of optimized design parameters. The set of optimized design parameters includes optimized values for the plurality of adjustable design parameters of each patterned spatially inhomogeneous dielectric layer. The patterned spatially inhomogeneous dielectric layer assembly 14 is fabricated (layer by layer) over the semiconductor light sensor with the plurality of adjustable design parameters for each patterned spatially inhomogeneous dielectric layer set to values that are within 20 percent of corresponding values in the set of optimized design parameters. In some refinement, the plurality of adjustable design parameters for each patterned spatially inhomogeneous dielectric layer set to values that are within 20 percent, 10 percent, 5 percent, 2 percent, or 1 percent of corresponding values in the set of optimized design parameters. Details for the semiconductor-based sensor 10, semiconductor light sensor element 12, patterned spatially inhomogeneous dielectric layer assembly 14, and patterned spatially inhomogeneous dielectric layers $16^p$ are set forth above.

Figure 6:
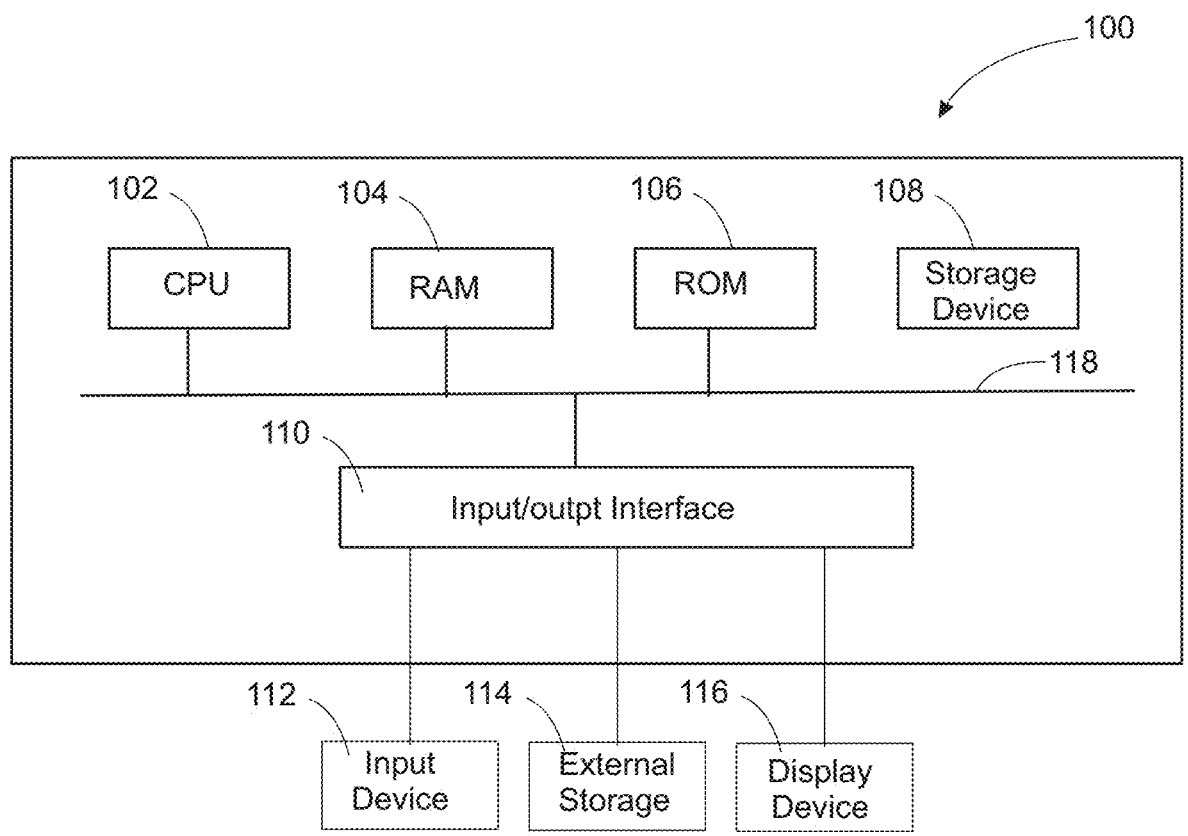
FIG. 6 is a block diagram of a computing system that can be used to implement the simulation and optimization methods and to calculate the optimized parameters.

The methods set forth herein implementing the simulation and optimization methods to calculate the set of optimized parameters can be implemented by specialized hardware design for that purpose. More commonly, these steps can be implemented by a computer program executing on a computing device. FIG. 6 provides a block diagram of a computing system that can be used to implement the simulation and optimization methods and to calculate the optimized parameters. Computing system 100 includes a processing unit 102 that executes the computer-readable instructions for the executable simulation and optimization methods to calculate the set of optimized parameters. Processing unit 102 can include one or more central processing units (CPU) or microprocessing units (MPU). Computer system 100 also includes RAM 104 or ROM 106 that can have instructions encoded thereon for the simulation and optimization methods. Computer system 100 can also include a secondary storage device 108, such as a hard drive. Input/output interface 110 allows interaction of computing device 100 with an input device 112 such as a keyboard and mouse, external storage 114 (e.g., DVDs and CDROMs), and a display device 116 (e.g., a monitor). Processing unit 102, the RAM 104, the ROM 106, the secondary storage device 108, and input/output interface 110 are in electrical communication with (e.g., connected to) bus 118. During operation, computer system 100 reads computer-executable instructions (e.g., one or more programs) recorded on a non-transitory computer-readable storage medium which can be secondary storage device 108 and or external storage 114. Processing unit 102 executes these reads computer-executable instructions for the simulation and optimization methods to calculate the set of optimized parameters set forth above. Specific examples of non-transitory computer-readable storage medium for which executable instructions of the optimization and simulation methods are encoded onto include but are not limited to, a hard disk, RAM, ROM, an optical disk (e.g., compact disc, DVD), or Blu-ray Disc (BD)™, a flash memory device, a memory card, and the like.

The following examples illustrate the various embodiments of the present invention. Those skilled in the art will recognize many variations that are within the spirit of the present invention and scope of the claims.

Figure 7A:
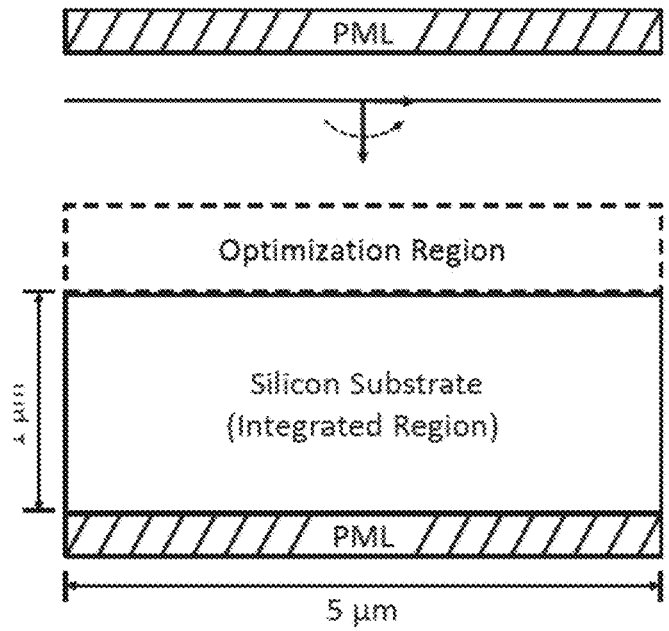
FIG. 7A provides a schematic of the model cell used for the optimization of a metasurface layer.
Figure 7B:
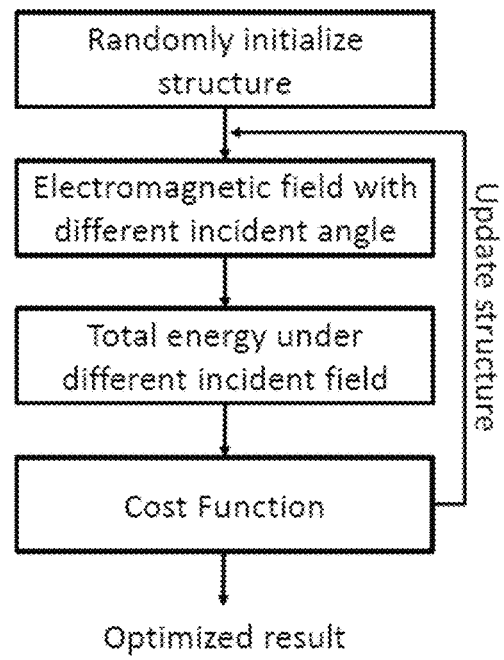
FIG. 7B is a flow chart of the optimization method of a metasurface layer.

FIG. 7A provides a schematic of a simulation cell used in the analysis is provided. When designing the metasurfaces, a perfectly matched layer (PML) boundary condition is used in the z-direction and the periodic boundary conditions in the x-direction. Therefore the calculation of absorption was performed in an array configuration. The metasurfaces were assumed infinite in the y-direction. In our electromagnetic calculations, we assumed that the incoming light impinged normally on the metasurface. That is, the incoming electromagnetic wave propagated along the z-direction. FIG. 7B is a flow chart of the optimization method for a metasurface.

Exemplary Optimization

Particle Swarming Optimization (PSO) is implemented in MATLAB. The pitch of the design region is 5 μm, and the region is discretized into 100 cells. The refractive index of each cell is represented by a value $n_i \in [1.00, 2.09]$ (the refractive index of air is 1.00 and the refractive index of $HfO_2$ is 2.09). In each iteration, the Lumerical FDTD is employed to calculate the transmission response given all refractive index $n_i$. The PSO algorithm then calculates the value of the objective function and update all $n_i$. When the value of the objective function changes less than the threshold (0.01) in five consecutive iterations. The algorithm terminates and outputs the result.

After that, we set two thresholds to binary the result. If $n_i \in [1.00, 1.36]$, we set $n_i = 1.00$. If $n_i \in [1.36, 1.73]$, we set $n_i = 2.09$ and this unit cell is only one layer $HfO_2$. The thickness is 250 nm. If $n_i \in [1.73, 2.09]$, we set $n_i = 2.09$ and this unit cell has two-layer $HfO_2$. The thickness of each layer is 250 nm.

Example 1

Figure 8A:
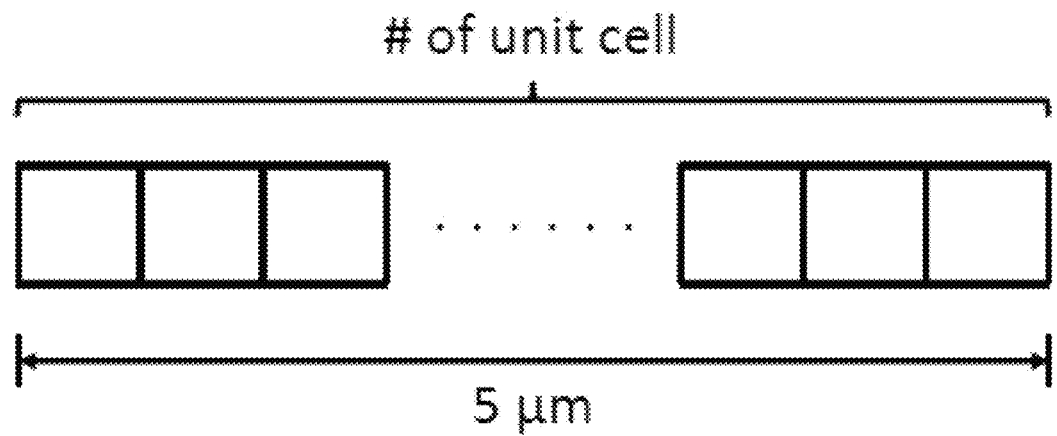
FIG. 8A is a schematic of the modeled layer used in a continuous particle Swarm optimization.
Figure 8B:
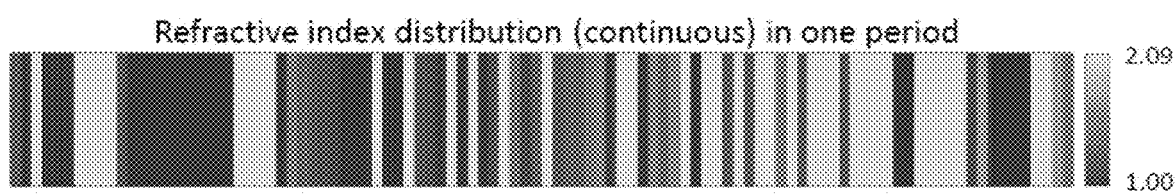
FIG. 8B provides the continuous particle Swarm optimization results for the refractive index of each cell.

The model of FIG. 8A was used in a continuous particle Swarm optimization. In this example, continuous means that that refractive index could take any value from a lower bound of 1 and an upper bound of 2.09 The optimization was subject to the fixed parameters:

Unit cell size=50 nm
Number of metasurface layers=1
Incident angle∈[−30° 30°].

Figure 8C:
FIG. 8C provides the round off of continuous particle Swarm optimization results for the refractive index of each cell.
Figure 9A:
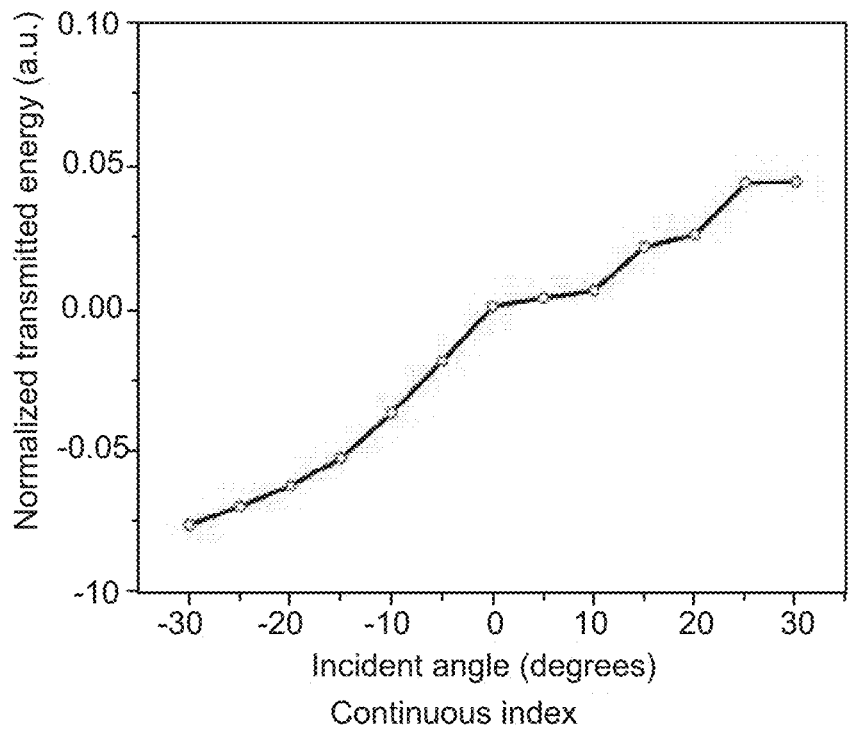
FIG. 9A provides the transmission vs angle for the continuous index case determined by the continuous particle Swarm optimization.
Figure 9B:
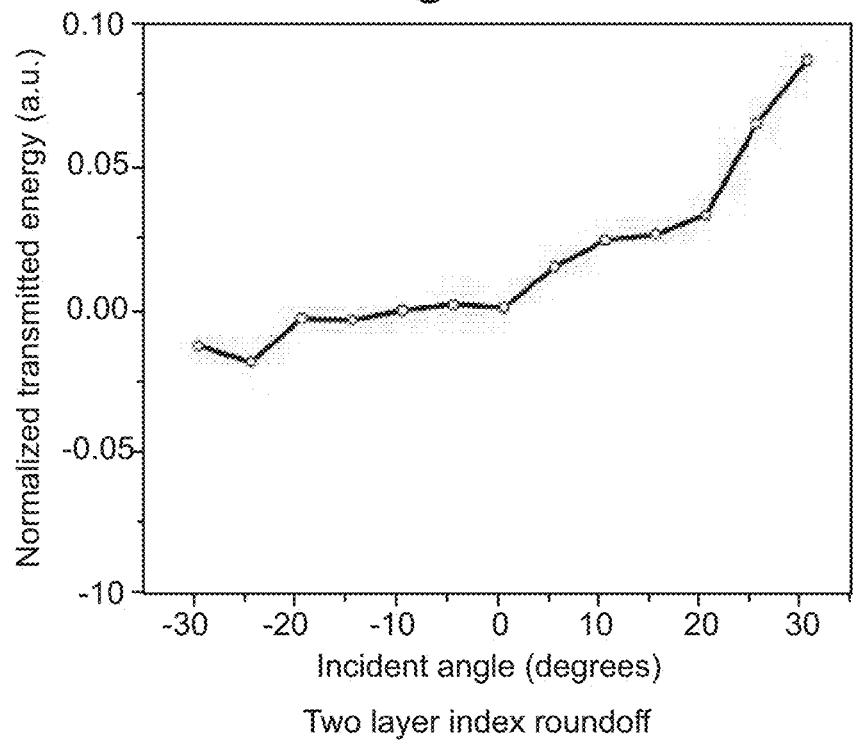
FIG. 9B provides the transmission vs angle for the two layer index roundoff case determined by the continuous particle Swarm optimization.

FIG. 8C provides the continuous particle Swarm optimization results for the refractive index of each cell. In FIG. 8C, the refractive index was rounded off as follows:

Refractive index∈[1.00, 1.36), set to be air
Refractive index∈[136, 1.73), set to be air
Refractive index∈[1.73, 2.09], set to be air FIG. 9A provides the transmission vs angle for the continuous index case determined by the continuous particle Swarm optimization. FIG. 9B provides the transmission vs angle for the two layer index roundoff case determined by the continuous particle Swarm optimization.

Example 2

Figure 10A:
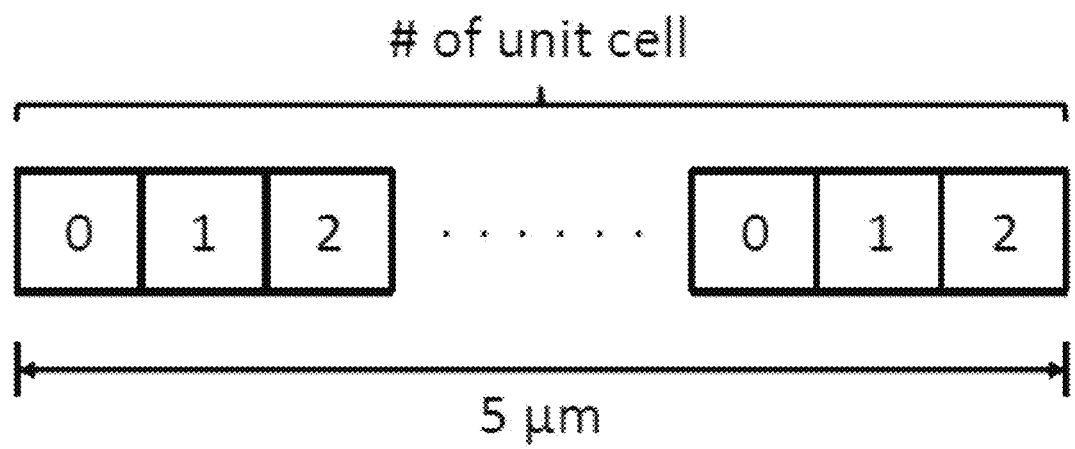
FIG. 10A is a schematic of the modeled metasurface layer for an integer particle Swarm optimization.

FIG. 10A is a schematic of the modeled metasurface layer for an integer particle Swarm optimization. The optimization was subject to the fixed parameters:

Unit cell size=125 nm
# of layers=1
Incident angle∈[−30° 30° ]

Figure 10B:
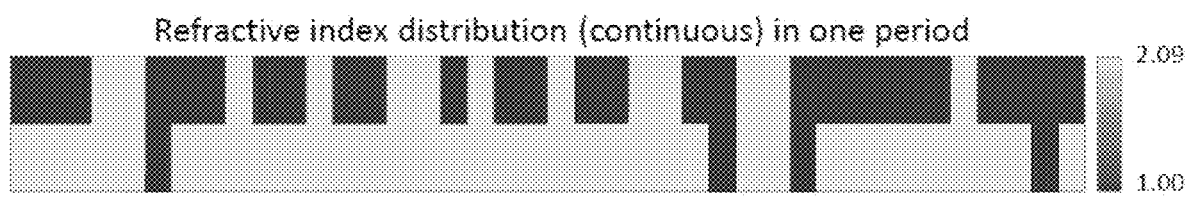
FIG. 10B provides the refractive index distribution for the integer particle Swarm optimization.
Figure 10C:
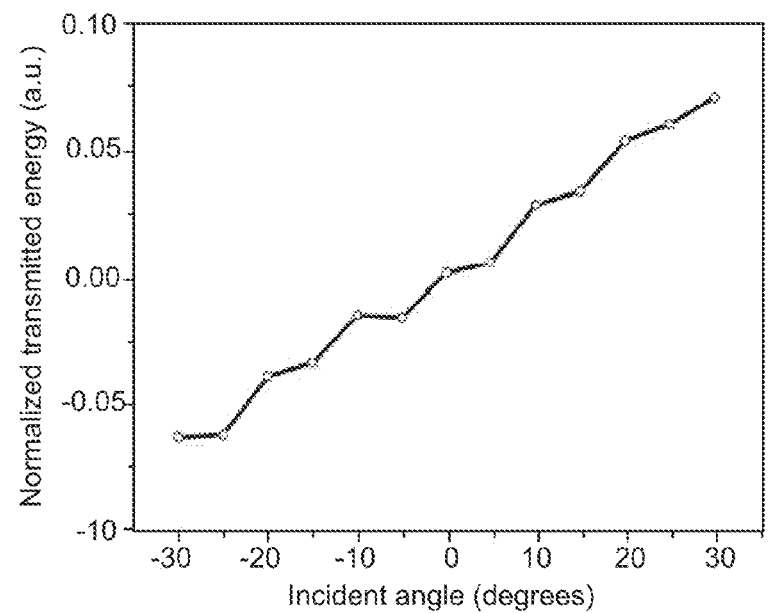
FIG. 10C provides transmission vs angle for the continuous index for an integer particle Swarm optimization.

The Swarm parameters varied were the grating height and the refractive index as follows: '0' represent air, '1' represents one layer $HfO_2$, '2' represents two layer $HfO_2$. FIG. 10B provides the refractive index distribution for the integer particle Swarm optimization. FIG. 10C provides transmission vs angle for the continuous index for an integer particle Swarm optimization. FIG. 10D is the electrical field distribution when light incident at different angles. The enhancements were calculated based on those field distributions.

Example 3

Figure 11A:
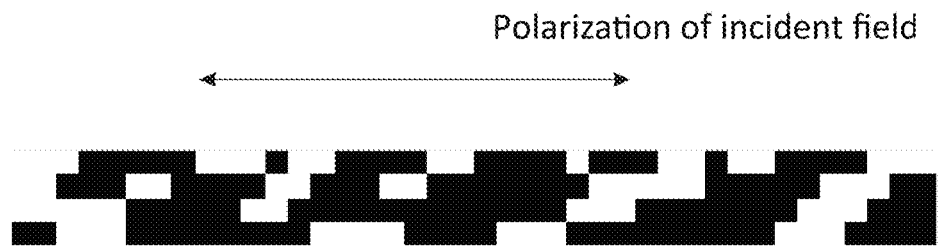
FIG. 11A provides a cross-section of a four-layer metasurface having layers composed of titanium oxide cells and silicon oxide cells. Black part is $TiO_2$ and the white part is $SiO_2$.
Figure 11B:
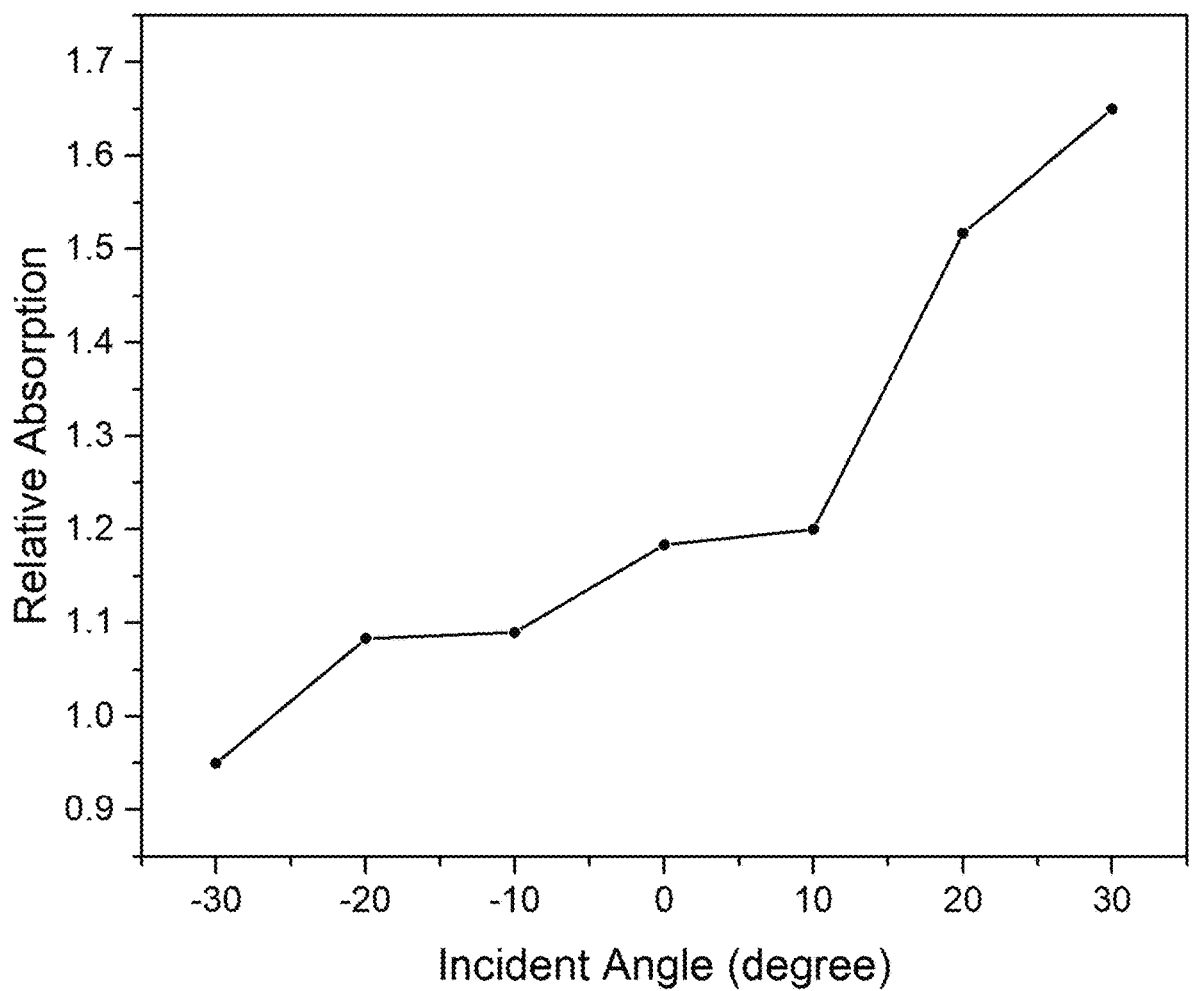
FIG. 11B provides the simulation/optimization plot of the relative absorption vs incident angle for the four-layer metasurface of FIG. 10A.
Figure 11D:
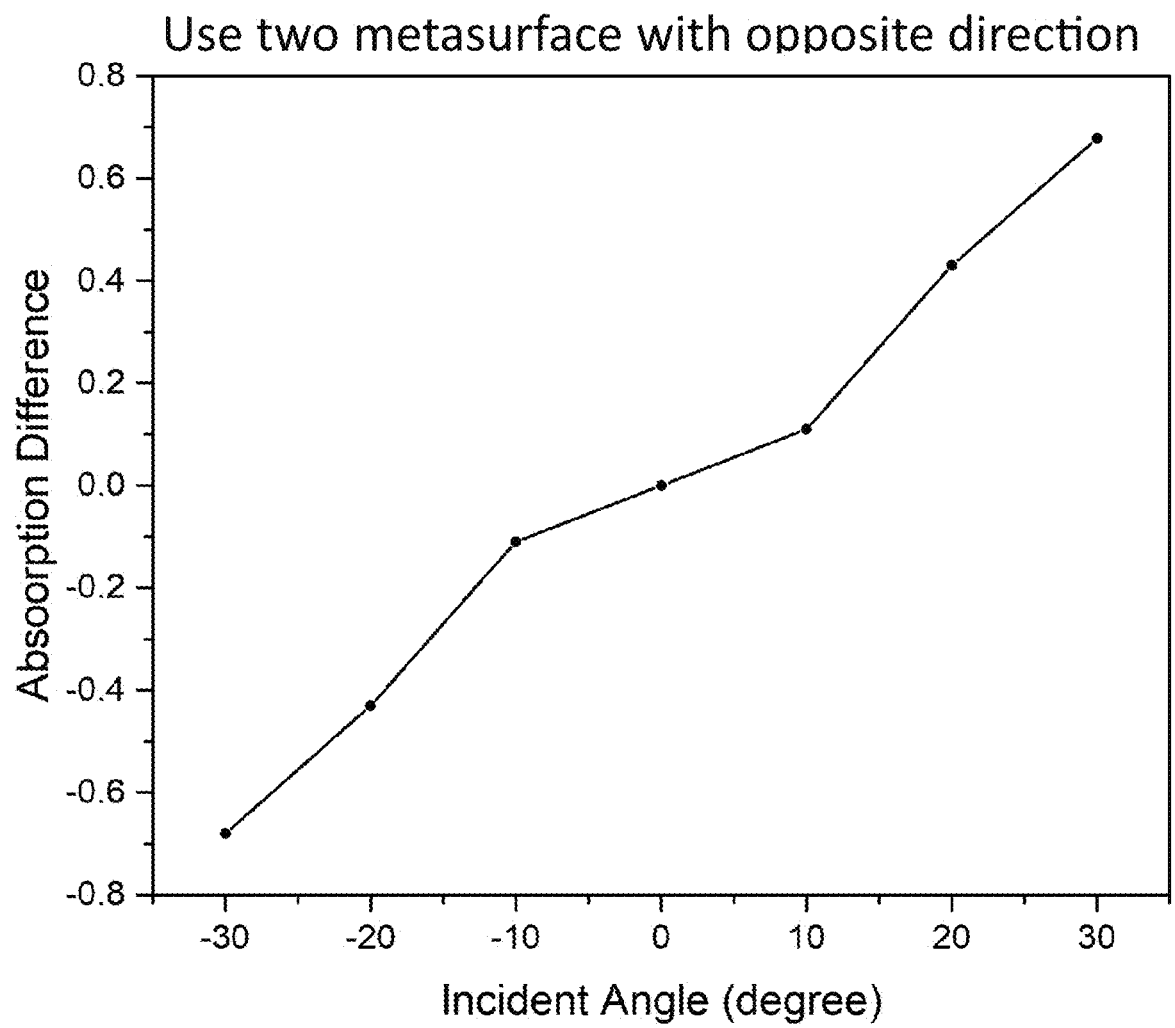
FIG. 11D provides the simulation/optimization plot of the relative absorption vs incident angle for the use of two of the four-layer metasurfaces of FIG. 11A oriented in opposite directions.

FIG. 11A provides an example of a four-layer metasurface having layers composed of titanium oxide cells and silicon oxide cells. The metasurface for this simulation/optimization has a period of 2 microns and a height of 500 nm. FIG. 11B provides the simulation/optimization plot of the relative absorption vs incident angle for the four-layer metasurface. The relative absorption is observed monotonically increase from −30° to 30°. FIG. 11C provides the field distribution for the four-layer metasurface at angles of incidence of −30°, −20°, −10°, 0°, 10°, 20°, and 30°. FIG. 11D provides the simulation/optimization plot of the relative absorption vs incident angle for the use of two of the four-layer metasurfaces oriented in opposite directions.

Example 4

Figure 12A:
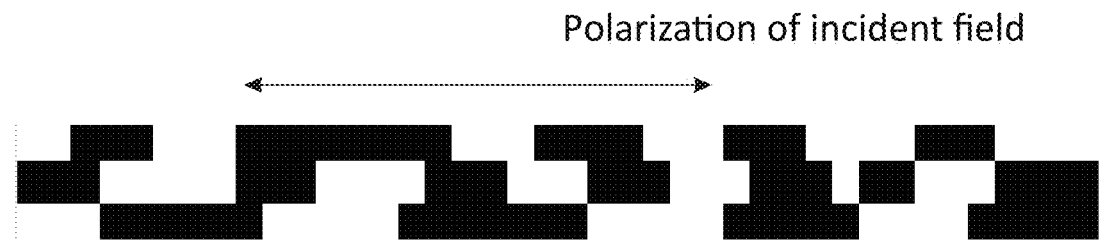
FIG. 12A provides a cross-section of a three-layer metasurface having layers composed of titanium oxide cells and silicon oxide cells. Black part is $TiO_2$ and the white part is $SiO_2$.
Figure 12B:
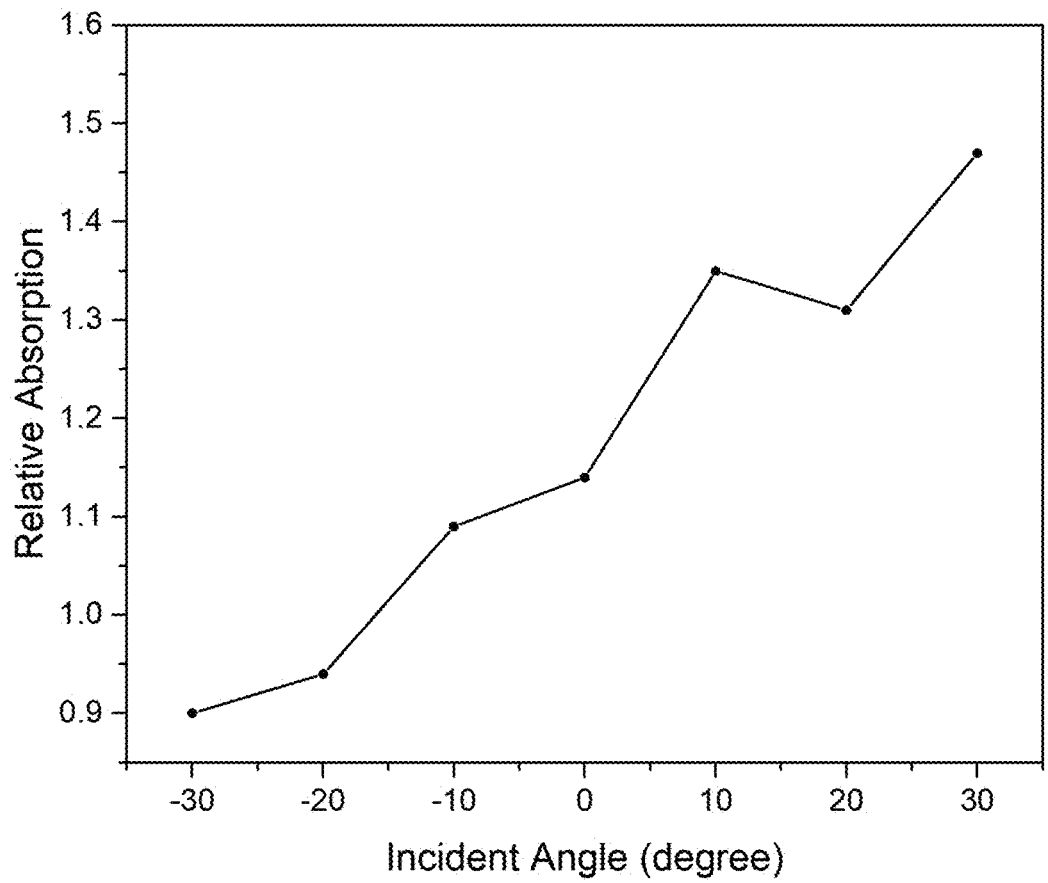
FIG. 12B provides the simulation/optimization plot of the relative absorption vs incident angle for the three-layer metasurface of FIG. 11A.
Figure 12C:
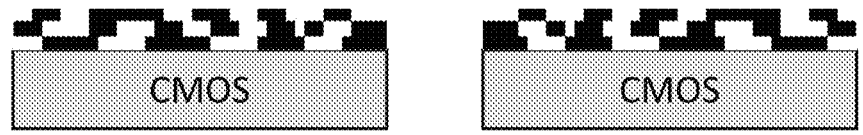
FIG. 12C provides the simulation/optimization plot of the relative absorption vs incident angle for the use of two of the three-layer metasurfaces of FIG. 11A oriented in opposite directions.
Figure 12C:

FIG. 12A provides an example of a three-layer metasurface having layers composed of titanium oxide cells and silicon oxide cells. The metasurface for this simulation/optimization has a period of 2 microns and a height of 500 nm. FIG. 12B provides the simulation/optimization provide the relative absorption vs incident angle. The relative absorption is observed monotonically increase at angles of incidence from −30° to 30°. FIG. 12C provides the simulation/optimization plot of the relative absorption vs incident angle for the use of two of the four-layer metasurfaces oriented in opposite directions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A semiconductor-based sensor to detect one or more light angles of incidence comprising:
   a semiconductor light sensor element; and
   a patterned spatially inhomogeneous dielectric layer assembly disposed over the semiconductor light sensor element wherein spatial inhomogeneity of the patterned spatially inhomogeneous dielectric layer assembly is optimized to provide a maximized electric field in the semiconductor light sensor element such that the semiconductor-based sensor is configured to detect one or more incident angles of light at a predefined wavelength or wavelengths of light, the patterned spatially inhomogeneous dielectric layer assembly including one or more patterned spatially inhomogeneous dielectric layers, wherein each patterned spatially inhomogeneous dielectric layer includes an array of cells having subsets of cells with a different refractive index.

2. The semiconductor-based sensor of claim 1, wherein the patterned spatially inhomogeneous dielectric layer assembly includes two or more patterned spatially inhomogeneous dielectric layers.

3. The semiconductor-based sensor of claim 2, wherein the patterned spatially inhomogeneous dielectric layer assembly includes 2, 3, 4, or 5 patterned spatially inhomogeneous dielectric layers.

4. The semiconductor-based sensor of claim 2, wherein each patterned spatially inhomogeneous dielectric layer has a non-periodic arrangement of dielectric cells.

5. The semiconductor-based sensor of claim 2, wherein adjacent patterned spatially inhomogeneous dielectric layers have a different arrangement of dielectric cells from each other.

6. The semiconductor-based sensor of claim 1, wherein the patterned spatially inhomogeneous dielectric layer assembly is a metasurface.

7. The semiconductor-based sensor of claim 1, wherein the semiconductor light sensor element is a CMOS light sensor element.

8. The semiconductor-based sensor of claim 1, wherein incident light has a wavelength from 380 nm to 2500 nm.

9. The semiconductor-based sensor of claim 1, wherein the array of cells include cells that are rectangular columns extending across a surface of the semiconductor light sensor element.

10. The semiconductor-based sensor of claim 1, wherein the array of cells include cells that are discrete objects that alternate along each direction of a surface of the semiconductor light sensor element.

11. The semiconductor-based sensor of claim 1, the array of cells include cells that are formed from a dielectric material or sublayers thereof.

12. The semiconductor-based sensor of claim 11, wherein a first subset of the cells are a high-κ dielectric.

13. The semiconductor-based sensor of claim 12, wherein the high-κ dielectric is selected from the group consisting of hafnium silicate, zirconium silicate, hafnium dioxide, zirconium dioxide, and combinations thereof.

14. The semiconductor-based sensor of claim 12, wherein a second subset of the cells are air gaps.

15. A system comprising multiple semiconductor-based sensors of claim 1 configured to simultaneously measure both light intensity and angle.

16. The semiconductor-based sensor of claim 1, wherein the patterned spatially inhomogeneous dielectric layer assembly includes cells having two or more dielectric layers.

17. A semiconductor-based sensor to detect one or more light angles of incidence comprising:
    a semiconductor light sensor element; and
    a patterned spatially inhomogeneous dielectric layer assembly disposed over the semiconductor light sensor element wherein spatial inhomogeneity of the patterned spatially inhomogeneous dielectric layer assembly is optimized to provide a maximized electric field in the semiconductor light sensor element such that the semiconductor-based sensor is operable to detect one or more incident angles of light at a predefined wavelength or wavelengths of light, the patterned spatially inhomogeneous dielectric layer assembly including two or more patterned spatially inhomogeneous dielectric layers, wherein each patterned spatially inhomogeneous dielectric layer has a non-periodic arrangement of dielectric cells.

18. The semiconductor-based sensor of claim 17, wherein the patterned spatially inhomogeneous dielectric layer assembly includes 2, 3, 4, or 5 patterned spatially inhomogeneous dielectric layers.

19. The semiconductor-based sensor of claim 17, wherein adjacent patterned spatially inhomogeneous dielectric layers have a different arrangement of dielectric cells from each other.

20. The semiconductor-based sensor of claim 17, wherein the semiconductor light sensor element is a CMOS light sensor element.

21. The semiconductor-based sensor of claim 17, wherein incident light has a wavelength from 380 nm to 2500 nm.

22. The semiconductor-based sensor of claim 17, wherein each patterned spatially inhomogeneous dielectric layer includes an array of cells having subsets of cells with a different refractive index.

23. The semiconductor-based sensor of claim 22, wherein the array of cells include cells that are discrete objects that alternate along each direction of a surface of the semiconductor light sensor element.

24. A semiconductor-based sensor to detect one or more light angles of incidence comprising:
   a semiconductor light sensor element; and
   a patterned spatially inhomogeneous dielectric layer assembly disposed over the semiconductor light sensor element wherein spatial inhomogeneity of the patterned spatially inhomogeneous dielectric layer assembly is optimized to provide a maximized electric field in the semiconductor light sensor element such that the semiconductor-based sensor is operable to detect one or more incident angles of light at a predefined wavelength or wavelengths of light, the patterned spatially inhomogeneous dielectric layer assembly including two or more patterned spatially inhomogeneous dielectric layers, wherein adjacent patterned spatially inhomogeneous dielectric layers have a different arrangement of dielectric cells from each other.

25. The semiconductor-based sensor of claim 24, wherein the patterned spatially inhomogeneous dielectric layer assembly includes 2, 3, 4, or 5 patterned spatially inhomogeneous dielectric layers.

26. The semiconductor-based sensor of claim 24, wherein each patterned spatially inhomogeneous dielectric layer has a non-periodic arrangement of dielectric cells.

27. The semiconductor-based sensor of claim 24, wherein the patterned spatially inhomogeneous dielectric layer assembly is a metasurface.

28. The semiconductor-based sensor of claim 24, wherein the semiconductor light sensor element is a CMOS light sensor element.

29. The semiconductor-based sensor of claim 24, wherein incident light has a wavelength from 380 nm to 2500 nm.

30. The semiconductor-based sensor of claim 24, wherein each patterned spatially inhomogeneous dielectric layer includes an array of cells having subsets of cells with a different refractive index.

31. The semiconductor-based sensor of claim 30, wherein the array of cells includes cells that are discrete objects that alternate along each direction of a surface of the semiconductor light sensor element.

* * * * *